Patented Jan. 14, 1936

2,027,766

UNITED STATES PATENT OFFICE 2,027,766

PROCESS FOR AMMONIATING ORGANIC MATERIALS

Royall O. E. Davis and Walter Scholl, Washington, D. C.; dedicated to the free use of the Public No Drawing. Application February 18, 1933, Serial No. 657,475

2 Claims. (Cl. 71—6)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government, for governmental purposes, without the payment to us of any royalty thereon.

We hereby dedicate the invention herein described to the free use of the public in the territory of the United States of America, to take effect upon the granting of a patent to us.

This invention relates to the preparation of organic nitrogenous fertilizers and other materials; to increasing the nitrogen content of organic materials of naturally low nitrogen content and to rendering such organic materials more readily decomposable in the soil and to thus enhance their value as fertilizer ingredients; and to the products thus obtained.

We have discovered that when organic materials, hereinafter more specifically described, are treated with ammonia, as likewise hereinafter described, the following results are obtained: (1) ammonia reacts to form a stable nitrogenous compound; (2) the ammonia so reacting is retained in a form substantially water-insoluble; (3) the product when placed in the soil is decomposable by soil agencies; and (4) the nitrogen thus added and likewise the nitrogen originally and naturally present in the materials treated, in the case of certain materials totally non-available, is, by our process, rendered available for the use of the growing plant.

Typical of the organic materials which can be thus converted by our process are those of plant origin, such as peat, wood waste, etc. etc., and those of animal origin, such as leather scrap, hair, etc. etc., but it is to be understood that we are not limited to those here mentioned, for there are many other materials which are susceptible to treatment by our process, and all such are included.

Organic materials such as peat contain in their natural condition many elements as minor constituents, such as silica, iron, aluminum, titanium, calcium, magnesium, sodium, potassium, etc., and these are to be considered as parts of the organic materials. The term organic materials as used throughout the present specifications and claims refers to materials derived from vegetable and animal sources whether they have been altered in composition by oxidation and decomposition or not, that is it refers to such various materials as coal, lignite, charcoal, carbon, peat, sawdust, leather scrap, hair, and plant and animal residues of all sorts. These materials may or may not contain other fertilizer elements than nitrogen. Ordinarily such materials contain relatively little of the ordinary fertilizer elements. Peat, for instance, contains on a dry basis from about one to four per cent of nitrogen and negligible amounts of other fertilizer ingredients but the nitrogen is in a form essentially unavailable for plant use. The inclusion of other organic materials such as peat in fertilizer mixtures is often desirable purely from the standpoint of improved physical condition of the mixture.

One of the objects of the present invention is to utilize organic materials such as peat as a carrier of nitrogen in a water insoluble form yet still available according to accredited chemical tests; the object being accomplished by the treatment of the organic material with ammonia in a comparatively simple process. Nitrogen in the form of the most common fertilizer materials, such as ammonium sulfate, sodium nitrate, urea, etc., is extremely soluble in water and when placed in the soil is quickly washed out. An insoluble form of nitrogen, however, will be retained in the soil until the plant has time to utilize it.

Another object of this invention is to produce an organic material containing nitrogen that is less readily available for plant use than the highly soluble forms of nitrogen compounds commonly used in fertilizers. In practice, it is desirable to include in mixed fertilizers, nitrogen compounds of a highly soluble nature and also material in which the nitrogen is in an insoluble form, but becomes available to the plant slowly during its growing period. The material prepared under this invention contains both forms of nitrogen but the greater part is in the form of insoluble nitrogen.

An additional object is to render available the nitrogen originally present in the organic materials as unavailable nitrogen. It is well known, for instance, that peat contains considerable nitrogen, ranging from one to four per cent, which is practically unavailable because of the extremely slow decomposition of ordinary peat in the soil. After treatment with ammonia however, as described in this invention, the original nitrogen to a large extent is rendered available for plant utilization.

Still other objects of this invention are to produce a fertilizer material which possesses certain desirable properties in mixed fertilizers; to provide organic matter which will act as a conditioner in the mixed material and improve the physical condition, preventing caking; to provide a portion of the nitrogen in a less soluble form so that in concentrated mixtures there will be less danger of burning plants due to the presence of highly soluble material; to furnish in mixed fertilizers an organic fertilizer, taking the place of ordinary filler and decomposable in the soil to form humus, thereby improving the soil condition for plant growth.

In carrying this invention into operation we have found that the application of the ammonia to the material to be converted can be effected in various ways and under various conditions; the ammonia may be in the form of a solution, hydrous, or anhydrous, gaseous or liquid; the temperatures, pressures and time of treatment, may be varied over wide limits, and the materials treated may be in a dry or wet condition, all yielding the products covered by this invention.

The conditions imposed during the operation of the process determine the amount of ammonia fixed in the product, and by varying the conditions independently or simultaneously a product with any desired amount of nitrogen up to 25% in it will be obtained. As an example the temperature may be varied from room temperature to 300° C., or the pressure from atmospheric to 1000 atmospheres, with corresponding differences in the amount of nitrogen in the product. The higher the temperature and pressure the greater is the amount of nitrogen fixed in the product.

However, there are certain preferred procedures and they, (or typical ones) will now be described as a specific embodiment of this invention, it being understood, however, that we are not limited to the details herein about to be described, but may establish any other set of operating conditions that yield the desired product.

In general the process consists of treating an organic material such as peat, leather scrap, etc., with ammonia. This may be done by bringing ammonia into contact with the organic material, either in an autoclave in which event heat and pressure may or may not be utilized to increase the amount of nitrogen absorbed, or in a vessel of relatively low fixed pressure in which case heat is necessary to accomplish the absorption desired. This temperature may be varied over a wide range up to 300° C., although temperatures below 50° C. are practically negligible. This condition is maintained for a period of preferably two to twenty-four hours although absorption results in varying degrees may be obtained outside those limits. The temperature is then allowed to drop to a point at which volatilization of absorbed nitrogen will be prevented. After the organic material has absorbed the desired amount of ammonia, the unreacted ammonia may be recovered by any convenient means.

A preferred procedure is charging peat or other organic material into an autoclave, closing the autoclave, bringing anhydrous ammonia into contact with the organic material, heating the material to a temperature of 180° to 300° C., maintaining the temperature for a period of 8 to 24 hours, allowing the mixture to drop to a temperature of 50° C. and removing the uncombined ammonia from the mixture.

We illustrate our process with a typical raw material, peat. For our purpose we prefer to dry the peat to a water content of 10%; 100 pounds of peat is charged into an autoclave, the autoclave is then closed, 50 pounds of anhydrous liquid ammonia is added through a connecting pipe with valve control, the temperature is raised by any convenient means to 200-250° C., and maintained thereat for two hours. Thereupon the temperature is allowed to drop preferably to 50° C., the excess of ammonia uncombined is removed for reuse, and the autoclave is discharged. The product obtained from the autoclave is a dark brown to black material and slightly resembles charred woody material. It is considerably denser than the original peat, is readily pulverized, is dry and has the physical properties desirable as a conditioner in mixed fertilizers. The nitrogen content of the product is from 15 to 25% depending on the type of peat used. The larger portion of the nitrogen in the product is insoluble in water, and the remainder soluble; but the insoluble portion is present in a form available for plant utilization according to official chemical tests.

The process may be further illustrated as follows: 100 pounds of ground leather scrap are placed in an autoclave, the autoclave is then closed, 100 pounds of 30 per cent aqueous ammonia is added through a connecting pipe with valve control, the temperature is raised to 200-250° C., by any convenient means and maintained thereat for two hours. Thereafter the temperature is allowed to drop preferably to 50° C. The excess of ammonia uncombined can be removed by any convenient means for reuse and the autoclave is discharged. The resulting fertilizer product may then be dried.

Or 100 pounds of peat dried to a water content of 10% is charged into a cylindrical vessel one end of which is closed and equipped with a relief valve. The valve is set to release at a pressure of 200 pounds per square inch, which pressure may, of course, be varied as dictated by the amount of nitrogen which it is desired to absorb in the peat. The other end of the vessel is associated with a source of ammonia, preferably in anhydrous form, by means of a connecting pipe. The peat is heated to a temperature of 200 to 300° C., and maintained thereat for a period of six hours, although a longer period results in a greater absorption of nitrogen by the peat. The ammonia is compressed in gaseous form into contact with the peat at a pressure of approximately 200 pounds, which pressure, of course, may be varied as indicated above, in accordance with the desired nitrogen absorption. The pressure is maintained throughout the process as stated above. The excess ammonia may be recovered by any convenient means and the remaining fertilizer material is discharged from the cylindrical vessel.

It is to be understood that the chemical reactions involved in the process, the subject of this invention, do not in any sense depend upon the familiar reaction whereby ammonia is absorbed to the saline form by its interaction with an acid, organic or inorganic. Again illustrating with peat, while it is common knowledge that its acidity is low, varying from a pH of from 3.2 to 7 plus, an acidity in fact so low that it can be measured by only the most sensitive methods, there is no relation between this acidity and the amount of ammonia absorbed. A peat of pH 7 and one of pH 3, for example, fix approximately the same amount of ammonia. Again 1 pound of a neutral peat of pH of 7, by our method will fix 25% of its weight of nitrogen as ammonia—an amount equivalent to 0.85 pounds of sulfuric acid or to 1.06 pounds of acetic acid; in other words, a given weight of a neutral material, peat, fixes the same amount of ammonia that an almost equal weight of sulfuric or acetic acid neutralizes, clearly demonstrating an entirely different order of chemical reaction from that of neutralization of an acid by a base to form a salt.

Furthermore, the reaction involved in the process is not related to absorption as ordinarily understood, for under conditions of absorption the ammonia has a vapor tension such that its presence can be readily detected from the odor of the material, and it can all be recovered by leaching with water; but in the case of the product obtained from our process the odor of ammonia is not discernable and only a small portion of the nitrogen can be removed by leaching.

The nitrogen present in the product obtained from our process is principally as water insoluble nitrogen which, however, is also "active nitrogen." The term active nitrogen refers to nitrogen present in a form exhibiting activity as measured by the generally recognized chemical tests, such as those prescribed by the Official Agricultural Chemist Association. Nitrogen insoluble in water and exhibiting such activity is recognized as becoming available in the soil for use to the growing plant and is therefore of great value as a plant nutrient when used as fertilizer.

The method as described pertains to the treatment of peat and leather scrap but the descriptions should be considered as illustrative only and not restrictive as to the materials or limiting details of the procedure. Other organic materials may be treated in essentially the same manner with suitable variation in conditions of temperature, time and pressure with a product resulting of the same essential character with regard to the ammonia fixed. Such details may be varied materially without departure from the essentials of our invention or the scope of the following claims.

We claim:

1. The process of manufacturing fertilizer materials which comprises charging peat into an autoclave, closing the autoclave, bringing anhydrous ammonia into contact with the peat, heating the mixture to a temperature of 180° to 300° C., maintaining said temperature for a period of eight hours, allowing the mixture to drop to a temperature of 50° C., and removing the uncombined ammonia from the mixture.

2. The process of manufacturing fertilizer materials which comprises charging organic materials into an autoclave, closing the autoclave, bringing anhydrous ammonia into contact with the organic materials, heating the mixture to a temperature of 180° to 300° C., maintaining said temperature for a period of twenty-four hours, allowing the mixture to drop to a temperature of 50° C., and removing the uncombined ammonia from the mixture.

ROYALL O. E. DAVIS.
WALTER SCHOLL.